United States Patent
Glasser et al.

(10) Patent No.: US 9,438,661 B2
(45) Date of Patent: **\*Sep. 6, 2016**

(54) SYNCHRONIZATION OF CLIENTS TO MAXIMIZE MULTICAST OPPORTUNITIES

(71) Applicant: AT&T INTELLECTUAL PROPERTY I, L.P., Atlanta, GA (US)

(72) Inventors: Alan L. Glasser, Manalapan, NJ (US); Andrew G. Gauld, Middletown, NJ (US); Vijay Gopalakrishnan, Edison, NJ (US); John F. Lucas, Tinton Falls, NJ (US); Kadangode K. Ramakrishnan, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/665,900

(22) Filed: Mar. 23, 2015

(65) Prior Publication Data

US 2015/0195333 A1  Jul. 9, 2015

Related U.S. Application Data

(60) Continuation of application No. 14/183,071, filed on Feb. 18, 2014, now Pat. No. 8,990,420, which is a continuation of application No. 13/404,946, filed on Feb. 24, 2012, now Pat. No. 8,656,042, which is a division of application No. 12/608,649, filed on Oct. 29, 2009, now Pat. No. 8,150,993.

(51) Int. Cl.
*G06F 15/16* (2006.01)
*H04L 29/08* (2006.01)
(Continued)

(52) U.S. Cl.
CPC ............. *H04L 67/02* (2013.01); *H04L 47/15* (2013.01); *H04L 49/201* (2013.01);
(Continued)

(58) Field of Classification Search
CPC . H04L 12/18; H04L 12/185; H04L 65/4076; H04N 21/262–21/2668
See application file for complete search history.

(56) References Cited

U.S. PATENT DOCUMENTS 5,459,725 A   10/1995  Bodner
5,905,871 A    5/1999  Buskens et al.
(Continued)

OTHER PUBLICATIONS

Ramesh, Sridhar, Injong Rhee, and Katherine Guo. "Multicast with cache (mcache): An adaptive zero-delay video-on-demand service." Circuits and Systems for Video Technology, IEEE Transactions on 11.3 (2001): 440-456.*

(Continued)

*Primary Examiner* — David Lazaro
*Assistant Examiner* — Julian Chang
(74) *Attorney, Agent, or Firm* — Akerman LLP; Mammen (Roy) P. Zachariah, Jr.; Michael K. Dixon

(57) ABSTRACT

A content monitor includes a processor that at least receives requests from a plurality of clients for content, instructs each client to retry their respective request at a first later time if the request is received before a first time, counts the requests to determine if a number of the requests exceeds a threshold if the request is received before a second time, instructs each client to retry their respective request at a second later time if the counted number of requests does not exceed a first threshold, instructs each client to join a multicast group to receive the content when the number of requests exceeds the first threshold, and counts a number of late clients joining the multicast group after a first portion of the content has been sent to the multicast group.

20 Claims, 7 Drawing Sheets

(51) Int. Cl.

| | |
|---|---|
| *H04W 72/00* | (2009.01) |
| *H04L 12/931* | (2013.01) |
| *H04W 56/00* | (2009.01) |
| *H04L 29/06* | (2006.01) |
| *H04L 12/801* | (2013.01) |
| *H04L 12/18* | (2006.01) |
| *H04N 21/6405* | (2011.01) |
| *H04N 21/262* | (2011.01) |

(52) U.S. Cl.
CPC .......... *H04L 65/4076* (2013.01); *H04L 65/60* (2013.01); *H04L 67/1008* (2013.01); *H04L 67/1014* (2013.01); *H04W 56/001* (2013.01); *H04W 72/005* (2013.01); *H04L 12/18* (2013.01); *H04N 21/26275* (2013.01); *H04N 21/6405* (2013.01)

(56) References Cited

U.S. PATENT DOCUMENTS

| | | |
|---|---|---|
| 6,011,782 A | 1/2000 | DeSimone et al. |
| 6,163,810 A | 12/2000 | Bhagavath et al. |
| 6,181,697 B1 | 1/2001 | Nurenberg et al. |
| 6,259,701 B1 | 7/2001 | Shur et al. |
| 6,269,080 B1 | 7/2001 | Kumar |
| 6,501,763 B1 | 12/2002 | Bhagavath et al. |
| 6,580,722 B1 | 6/2003 | Perlman |
| 6,693,907 B1 | 2/2004 | Wesley et al. |
| 6,704,576 B1 | 3/2004 | Brachman et al. |
| 6,763,019 B2 | 7/2004 | Mehta et al. |
| 6,782,490 B2 | 8/2004 | Maxemchuk et al. |
| 6,931,005 B1 | 8/2005 | Wilhelm |
| 7,031,326 B1 | 4/2006 | Shur et al. |
| 7,184,421 B1 | 2/2007 | Liu et al. |
| 7,224,702 B2 | 5/2007 | Lee |
| 7,281,058 B1 | 10/2007 | Shepherd et al. |
| 7,327,719 B2 | 2/2008 | Hardisty |
| 7,423,973 B2 | 9/2008 | Chen et al. |
| 7,535,903 B1 | 5/2009 | Patel |
| 7,558,587 B2 | 7/2009 | Albal et al. |
| 7,593,326 B2 | 9/2009 | Collet et al. |
| 7,885,199 B2 | 2/2011 | Mooney et al. |
| 7,886,056 B2 | 2/2011 | Collet et al. |
| 7,889,732 B2 | 2/2011 | Bijwaard et al. |
| 8,023,511 B2 | 9/2011 | Komiya et al. |
| 8,386,629 B2 | 2/2013 | Tan et al. |
| 8,738,743 B2 | 5/2014 | Tan et al. |
| 2002/0067724 A1 | 6/2002 | Helm et al. |
| 2002/0097728 A1 | 7/2002 | Hinderks et al. |
| 2003/0037331 A1 | 2/2003 | Lee |
| 2003/0131111 A1 | 7/2003 | Kimura et al. |
| 2004/0221029 A1 | 11/2004 | Jenkins et al. |
| 2004/0226045 A1 | 11/2004 | Nadarajah |
| 2005/0160137 A1 | 7/2005 | Ishikawa et al. |
| 2005/0172016 A1 | 8/2005 | Kossi et al. |
| 2005/0201406 A1 | 9/2005 | Sekine et al. |
| 2005/0216910 A1 | 9/2005 | Marchand |
| 2005/0216942 A1 | 9/2005 | Barton |
| 2005/0259584 A1 | 11/2005 | Chen et al. |
| 2005/0281270 A1 | 12/2005 | Kossi et al. |
| 2005/0283447 A1 | 12/2005 | Xu et al. |
| 2006/0161625 A1 | 7/2006 | Norp et al. |
| 2006/0265709 A1 | 11/2006 | Meaney |
| 2006/0268873 A1 | 11/2006 | Tonjes et al. |
| 2007/0005771 A1 | 1/2007 | Collet et al. |
| 2007/0008979 A1 | 1/2007 | Keller-Tuberg |
| 2007/0011237 A1 | 1/2007 | Mockett |
| 2007/0121629 A1 | 5/2007 | Cuijpers et al. |
| 2007/0130601 A1 | 6/2007 | Li et al. |
| 2007/0147411 A1 | 6/2007 | Bijwaard et al. |
| 2007/0168523 A1 | 7/2007 | Jiang et al. |
| 2007/0177592 A1 | 8/2007 | Mooney et al. |
| 2007/0192812 A1 | 8/2007 | Pickens et al. |
| 2007/0220573 A1 | 9/2007 | Chiussi et al. |
| 2007/0288638 A1 | 12/2007 | Vuong et al. |
| 2008/0008167 A1 | 1/2008 | Ver Steeg |
| 2008/0056255 A1 | 3/2008 | Birman et al. |
| 2008/0069071 A1 | 3/2008 | Tang |
| 2008/0077701 A1 | 3/2008 | Kongalath et al. |
| 2008/0098446 A1 | 4/2008 | Seckin et al. |
| 2008/0201752 A1 | 8/2008 | Liu et al. |
| 2008/0205394 A1 | 8/2008 | Deshpande et al. |
| 2008/0256409 A1 | 10/2008 | Oran et al. |
| 2009/0003342 A1 | 1/2009 | Dickens et al. |
| 2009/0006641 A1 | 1/2009 | Yaqoob et al. |
| 2009/0063681 A1* | 3/2009 | Ramakrishnan et al. .... 709/225 |
| 2009/0077255 A1 | 3/2009 | Smith et al. |
| 2009/0168679 A1 | 7/2009 | Benjamim et al. |
| 2009/0201929 A1 | 8/2009 | Patel |
| 2010/0020690 A1 | 1/2010 | Komiya et al. |
| 2010/0058405 A1* | 3/2010 | Ramakrishnan et al. ...... 725/97 |
| 2010/0103934 A1 | 4/2010 | Li et al. |
| 2010/0131995 A1 | 5/2010 | Guo et al. |
| 2010/0165902 A1 | 7/2010 | Kvernvik et al. |
| 2010/0186054 A1* | 7/2010 | Youn et al. .................. 725/103 |
| 2010/0250655 A1 | 9/2010 | Xu et al. |
| 2010/0293587 A1 | 11/2010 | Haimi-Cohen et al. |
| 2010/0316050 A1 | 12/2010 | Baykal et al. |
| 2011/0122873 A1 | 5/2011 | Bijwaad et al. |
| 2012/0066729 A1 | 3/2012 | Zou et al. |
| 2012/0317235 A1 | 12/2012 | Nguyen et al. |
| 2013/0144988 A1 | 6/2013 | Tan et al. |
| 2014/0245364 A1* | 8/2014 | Ramakrishnan et al. ...... 725/97 |

OTHER PUBLICATIONS

Cai, Ying, Kien A. Hua, and Khanh Vu. "Optimizing patching performance." Electronic Imaging'99. International Society for Optics and Photonics, 1998.*

Hlavacs, Helmut, and Shelley Buchinger. "Hierarchical video patching with optimal server bandwidth." ACM Transactions on Multimedia Computing, Communications, and Applications (TOMM) 4.1 (2008): 8.* e Silva, Edmundo de Souza, et al. "Performance issues of multimedia applications." Performance Evaluation of Complex Systems: Techniques and Tools. Springer Berlin Heidelberg, 2002. 374-404.*

Gao, Lixin, and Don Towsley. "Supplying instantaneous video-on-demand services using controlled multicast." Multimedia Computing and Systems, 1999. IEEE International Conference on. vol. 2. IEEE, 1999.*

Vogel et al., "Late join algorithms for distributed interactive applications," Multimedia Systems, pp. 327-336, 2003.

Gao et al. "Threshold-based multicasting for continuous media delivery," Multimedia, IEEE Transactions, vol. 3, No. 4, pp. 405-414, Dec. 2001.

* cited by examiner

SYNCHRONIZATION OF CLIENTS TO MAXIMIZE MULTICAST OPPORTUNITIES

CROSS REFERENCE TO RELATED APPLICATIONS

This application is a continuation of U.S. patent application Ser. No. 14/183,071 filed on Feb. 18, 2014, which is a continuation of U.S. patent application Ser. No. 13/404,946 filed on Feb. 24, 2012, now U.S. Pat. No. 8,656,042 which is a divisional of U.S. patent application Ser. No. 12/608,649 filed on Oct. 29, 2009, now U.S. Pat. No. 8,150,993, all of which are hereby incorporated by reference in their entireties.

FIELD OF THE DISCLOSURE

The present disclosure generally relates to communications networks, and more particularly relates to synchronization of clients to maximize multicast opportunities.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user. Additionally, digital content can include updates such as software and programming updates.

Unicast protocols offer point-to-point communication between a server and a client that can be used for delivering content. Unicast communications can be connection-oriented or connectionless. For connection-oriented unicast protocols, each request for content can result in the establishment of a connection between the server and the client. Maintaining the connection requires the server to dedicate the resources needed to provide the content to the client. For connectionless unicast communications, the server can send an amount of data towards the client without establishing a connection between the client and the server. While a connectionless unicast communication can avoid the overhead of establishing the connection and the need to reserve resources for the connection, the connectionless unicast communication may not provide a mechanism for ensuring delivery of the content.

In contrast to unicast protocols, multicast protocols can allow substantially simultaneous distribution of digital content to a large number of clients without creating multiple point-to-point connections. The server can provide the content to a multicast group with each member of the multicast group receiving a copy of the content at substantially the same time. Generally, multicast communications require network resources to replicate the content as it traverses the network and to maintain information regarding which clients are receiving the multicast content in order to ensure content is replicated throughout the network correctly.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
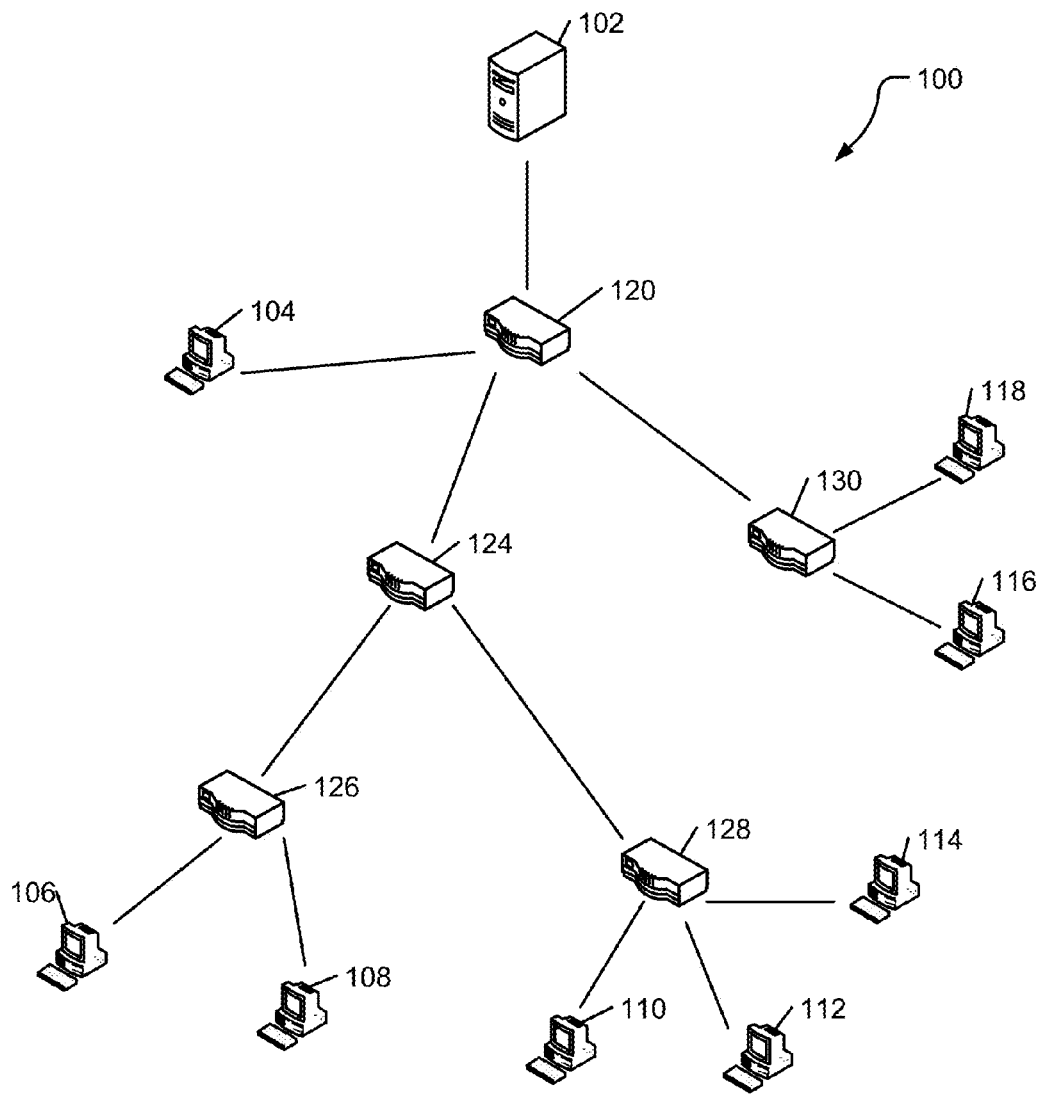
FIG. 1 is a block diagram illustrating a communications network in accordance with one embodiment of the present disclosure.

FIG. 1 shows a multicast tree 100 for distributing digital content through a geographically dispersed network, such as the Internet. Multicast tree 100 can include a server 102 and client systems 104 through 118. Server 102 and client systems 104 through 118 can communicate through a network of distribution points 120 through 130. The distribution points 120 through 130 may be routers. Alternatively, the distribution points 120 through 130 may be nodes of an overlay network. For example, communication from server 102 can travel through distribution points 120, 124, and 126 to client system 108 while communication from server 102 can travel through distribution points 120 and 130 to client 116. It will be appreciated that multicast tree 100 may be a logical overlay of a mesh network that, for example, may have a direct connection from distribution point 130 to 128, and also, for example, may have a direct connection from distribution point 126 to 130. These distribution points may be multicast-enabled routers. The distribution points may have the ability to cache content not only for immediate forwarding but also for later retransmission. In an embodiment, the server 102 can be a distribution node or edge server of a content delivery network. As such, the server 102 can receive digital content for distribution from an origin server.

Server 102 can use Internet Protocol (IP) multicast or any other multicast protocol to substantially simultaneously distribute digital content, such as a software update, to the client systems 104 through 118. The data file can be divided into multiple segments or data packets that may be, but are not necessarily IP packets, Ethernet frames, or similar lower layer packets. Using a multicast protocol, each such segment or data packet can move over each link of the network only once. The distribution points 120 through 130 can create copies, or otherwise forward incoming data on one port to multiple outbound ports, when the paths to the destinations split. For example, server 102 can send a multicast data packet to distribution point 120. Distribution point 120 can send a copy of the data packet to each of client 104, distribution point 124, and distribution point 130. Similarly, distribution point 130 can send, forward, or route, a copy of the segment, data packet, or individual low layer packets to each of client systems 116 and 118, and distribution point 124 can send a copy of the data packet to each of distribution points 126 and 128. Further, distribution point 126 can send a copy of the data packet to each of client systems 106 and 108 and distribution point 128 can send a copy of the data packet to each of client systems 110, 112, and 114. In other embodiments, the network underlying multicast tree 100 may be a shared medium, such as a bus or ring, with multicast occurring at a low network layer via common physical components and a common media access structure.

Generally, the distribution points construct the multicast tree 100 when client systems join a multicast group, and the server 102 may not have information about each member of the multicast group. Specifically, client systems can notify the network that they are interested in receiving data packets sent to the multicast group, such as by Internet Group Management Protocol. The server 102 can send a message addressed to the multicast group and each distribution point can replicate the data packet for each system of the multicast group.

The multicast tree 100 can include five multicast subtrees, each defined by a respective root node coupled with a path to the root node from the origin server 102. For example, there is a subtree comprising distribution node 126 as well as endpoints 106 and 108, coupled with path 102-120-124-126. There is also a subtree rooted at node 124, further comprising nodes 126 and 128 and endpoints 106 through 114, coupled with path 102-120-124.

There may be significant differences between the total costs for delivering content using unicast versus delivering content using multicast. For unicast delivery, there is a server cost associated with delivering the content to each client that requests it. The server cost can include memory utilization, CPU utilization, bandwidth utilization, and the like. For connection-oriented unicast delivery, there is a cost associated with each connection to a client. The available bandwidth, processing power, memory, number of processes, and number of connections can limit the number of clients that the server can serve concurrently. In addition to the server cost, there is a network cost associated with providing the content. Each router along the network path between the client and server can utilize resources for routing, buffering, and forwarding the content. Further, error detection and correction can impose costs on the server, such as parity calculations, and the network, such as an increased number of bits. The error detection and correction costs may be different for connection-oriented unicast than for connectionless unicast. Additionally, the connection between the server and the client requires a portion of the available bandwidth for each link along the network path. When providing the content to a large number of clients, the overall cost increases proportionally to the number of clients, as each point-to-point connection has a similar total cost. Additionally, when the clients are dispersed throughout the network, the costs impact the server and the network adjacent to the server more significantly than other portions of the network.

For multicast content delivery, the server only provides one data stream. Accordingly, the server cost is substantially fixed for a potentially unlimited number of clients, significantly reducing the server cost compared to unicast when serving a number of clients. Additionally, the costs associated with error correction and detection can be different for multicast transmission than for unicast transmission. Further, the content may traverse each link in the network only once, significantly reducing the network utilization of links having a large number of downstream clients. However, multicast distribution can require additional resources from each distribution point or router within the multicast tree. The distribution points of the multicast tree may need to maintain a list of downstream devices that are part of the tree, track the downstream devices as they join or leave the multicast tree, and duplicate the network traffic to each of the downstream devices. Because the content is duplicated within the network, the total cost can be distributed more evenly throughout the network when delivering content to a large number of clients. Specifically, the costs nearest to the server can be substantially fixed, even through the number of clients may increase dramatically.

Generally, for a single client, unicast delivery has a lower cost than multicast delivery. However, once the number of clients exceeds a threshold, multicast delivery can be a significantly more efficient way to deliver the content. Further, unicast delivery can provide content to multiple clients that request content at slightly different times, whereas multicast delivery requires the coordination of the client requests because the content is simultaneously sent to all the clients. Efficient delivery of content can require determining if the number of clients exceeds the threshold and coordinating the requests of the clients, such that a single multicast can serve a large number of clients.

Figure 2:
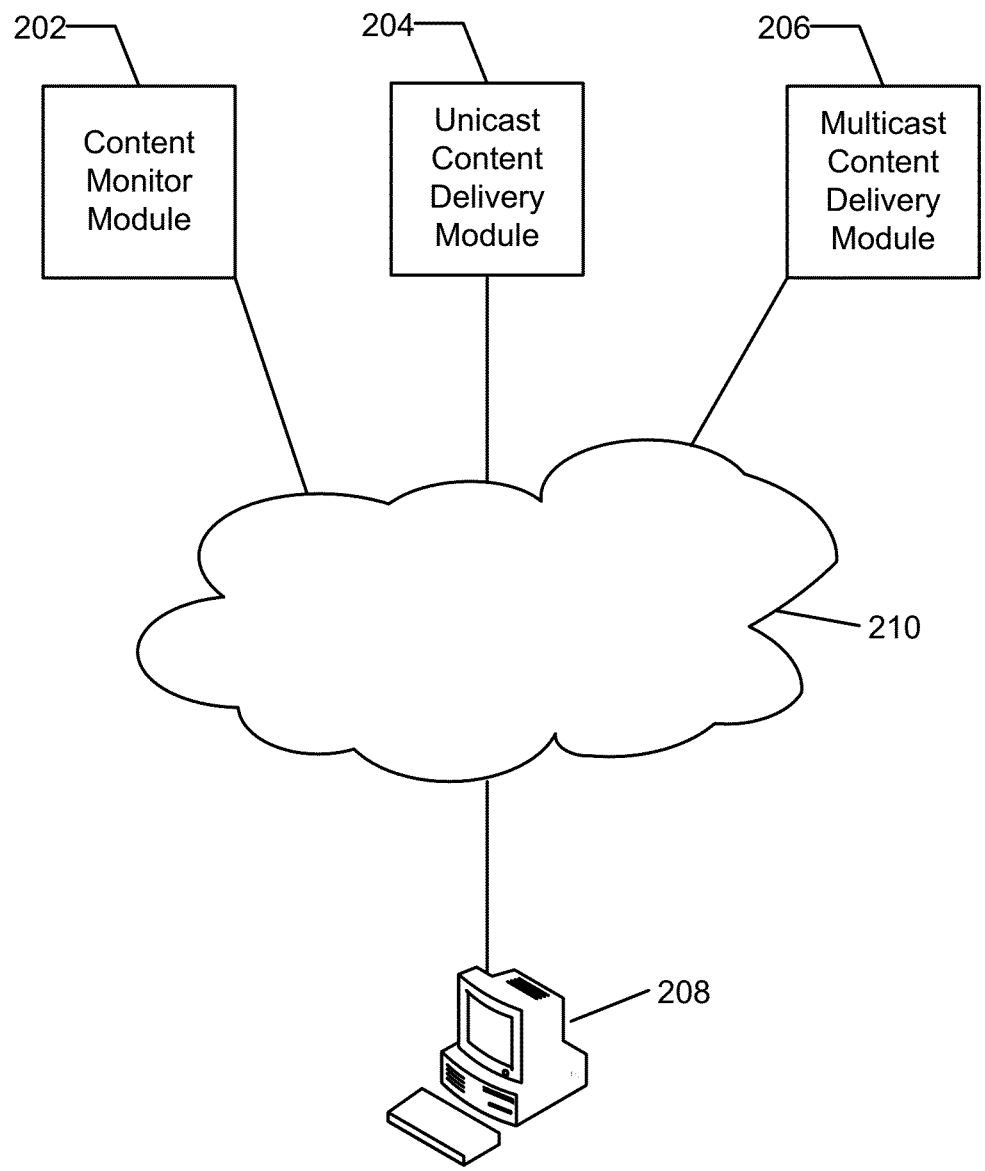
FIG. 2 is a block diagram illustrating a system for providing content in accordance with one embodiment of the present disclosure.

FIG. 2 illustrates an exemplary system for delivery of content, generally designated 200. The system can include a content monitor module 202, a unicast content delivery module 204, and a multicast content delivery module 206. The content monitor module 202, the unicast content delivery module 204, and the multicast content delivery module 206 can be implemented in hardware, software, or any combination thereof. Each module may include one or more computer systems. When a module includes more than one computer system, the functions of the module can be distributed across the multiple computer systems in a symmetric manner, that is, each computer system performs the same type of tasks, or in an asymmetric manner, that is, two computer systems of the module may perform different tasks.

Client system 208 can communicate with the system 200 through a network 210. Client system 208 can send a request for content to the content monitor module 202 to determine if new or updated content is available. The content may be content that need not be delivered on demand, such as periodic updates to software. Additionally, the content may be audio or video content that is prefetched and stored on a client system. Further examples can include data sets that are periodically updated and subscriptions to information feeds that are updated periodically. The content monitor module 202 can count the number of clients making requests for a specific content item. Additionally, the content monitor module 202 can respond to a request from the client system 208 with an instruction to repeat the request at a specified later time, an instruction to retrieve available content from the multicast delivery module 206, optionally specifying a time in the future at which the multicast delivery will begin, or an instruction to retrieve the content from the unicast content delivery module 204. When a sufficient number of client systems are requesting the same content, the content monitor module 202 can instruct the client system 208 to retrieve the content from the multicast content delivery module 206 to reduce the costs associated with content delivery. Alternatively, when a small number of client systems are requesting the same content, it may be more efficient to deliver the content using unicast and the client system 208 can be instructed to retrieve the content from the unicast content delivery module 204.

In an embodiment, the client system may periodically send a request to the content delivery system to determine when new or updated content becomes available and the content delivery system may receive new or updated content prior to the content being available to the client system. For example, the content delivery system may receive a software update along with a time for the software update to be made available to client systems.

Figure 3:
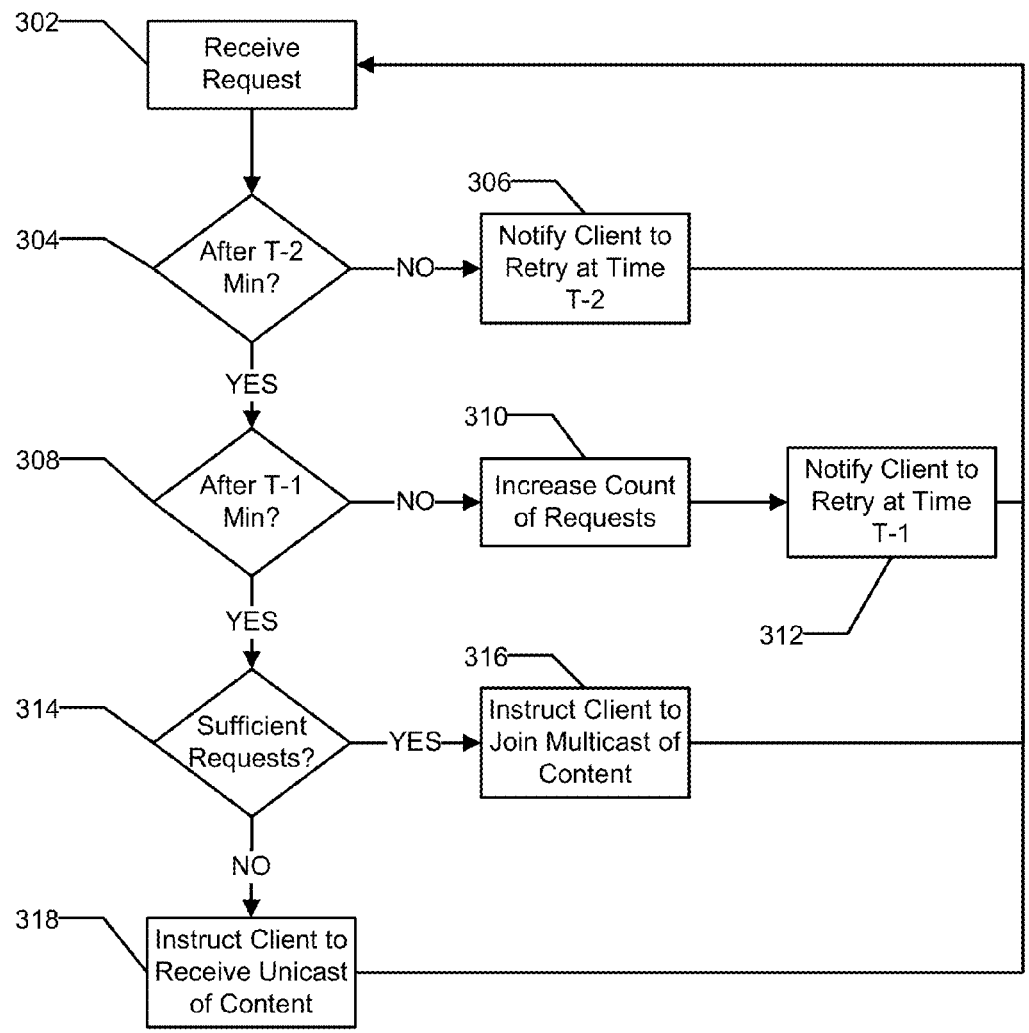
FIG. 3 is a flow diagram illustrating an exemplary method of providing content in accordance with one embodiment of the present disclosure.

FIG. 3 illustrates an exemplary method of delivering content. At 302, a content delivery system, such as content delivery system 200, can receive a request from a client system, such as client system 208. At 304, the content delivery system can determine if the current time is after a first specified time. The first specified time could be a first number of seconds or minutes prior to when the content can be made available to the client system. If the current time is not after the first specified time, the content delivery system can notify the client system to try again after the first specified time, as illustrated at 306. At 302, the content delivery system can receive another request.

In an embodiment, the content delivery system can determine a number of minutes until the first specified time period and notify the client system to try again after the determined number of minutes. For example, the first specified time can be about two minutes prior to when the content can be made available, although shorter or longer time periods are contemplated. If the current time is more than two minutes prior to when the content can be made available, the content delivery system can determine the number of minutes (Y) between the current time (C) and two minutes prior to the content being made available (T-2), Y=T-2-C. The content delivery system can notify the client system to try again in Y minutes.

Returning to 304, when the current time is after the first specified time, the content delivery system can determine if the current time is after a second specified time, as illustrated at 308. The second specified time could be a second number of seconds or minutes prior to when the content can be made available to the client system. The second number of seconds or minutes can be less than the first number of seconds or minutes. If the current time is not after the second specified time, the content delivery system can increase a count of the requests received for the content within the second specified time, as illustrated at 310, and the content delivery system can notify the client system to try again after the second specified time, as illustrated at 312. At 302, the content delivery system can receive another request.

In an embodiment, the content delivery system can determine a number of minutes until the second specified time and notify the client system to try again after the determined number of minutes. For example, the second specified time can be about one minute prior to when the content can be made available to the client system, although shorter or longer time periods are contemplated. If the current time is before one minute prior to when the content can be made available to the client system, the content delivery system can determine the number of minutes (Y) between the current time (C) and one minute prior to the content being made available (T-1), Y=T-1-C, and notify the client to try again in Y minutes.

Returning to 308, when the current time is after the second specified time, the content delivery system can determine if sufficient requests have been received to make multicast delivery more efficient than unicast delivery, as illustrated at 314. Multicast delivery can be more efficient than unicast delivery when the total cost of delivering the content to all of the requesting clients using multicast is less than the total cost of delivering the content to all of the requesting clients using unicast. The total cost can include server cost, network cost, router cost, or any combination thereof. When there are a sufficient number of requests, the content delivery system can instruct the client system to join a multicast session to retrieve the content, as illustrated at 316, and the content delivery system can receive another request at 302. Alternatively, when there is not a sufficient number of requests, the content delivery system can instruct the client system to request unicast delivery of the content, as illustrated at 318, and the content delivery system can receive another request at 302.

Figure 4:
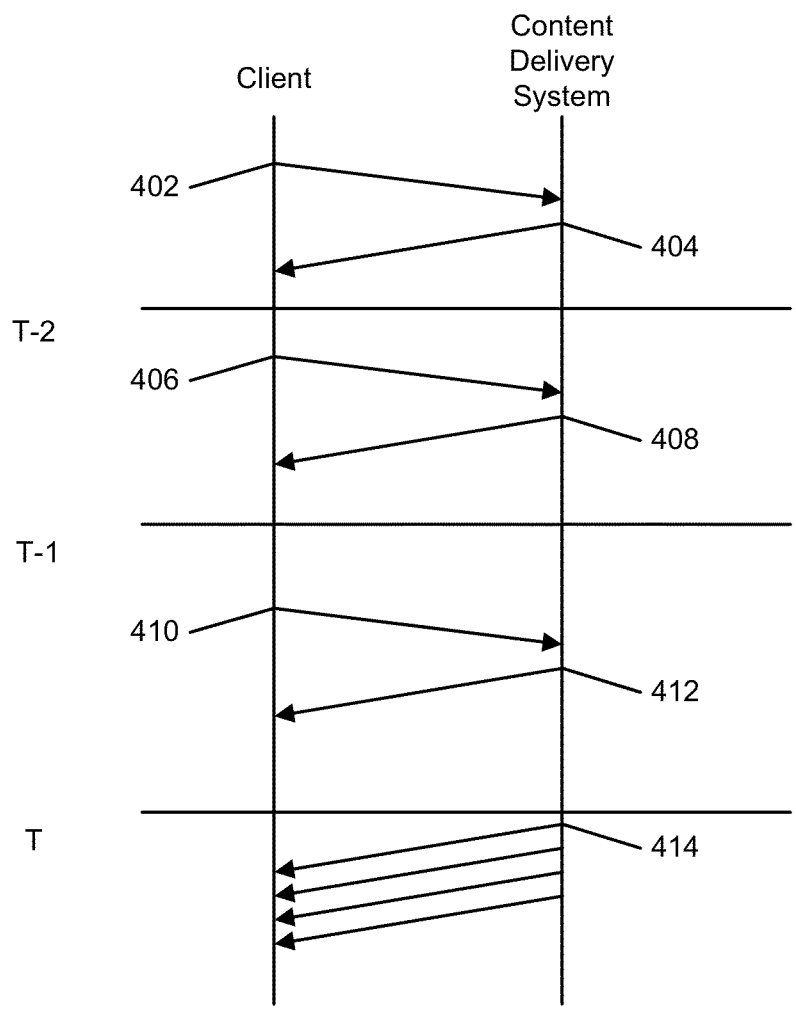
FIG. 4 is a timing diagram illustrating delivery of content in accordance with one embodiment of the present disclosure.

FIG. 4 shows a timeline illustrating the delivery of content. At 402, the client system can send a request for content to the content delivery system. At 404, the content delivery system can instruct the client system to try again between T-2 and T-1. At 406, the client system can send a request to the content delivery system. At 408, the content delivery system can count the request and notify the client system to try again in one minute, between T-1 and T. At about T-1, the content delivery system can determine that the number of requests exceeds a threshold such that multicast content delivery can be more efficient that unicast content delivery. At 410, the client system can send a request to the content delivery system. At 412, the content delivery system can notify the client to join a multicast group to receive the updated content. The client system can join the multicast group and at about T, and the content delivery system can begin a multicast distribution of the content to the client system, as illustrated at 414.

Figure 5:
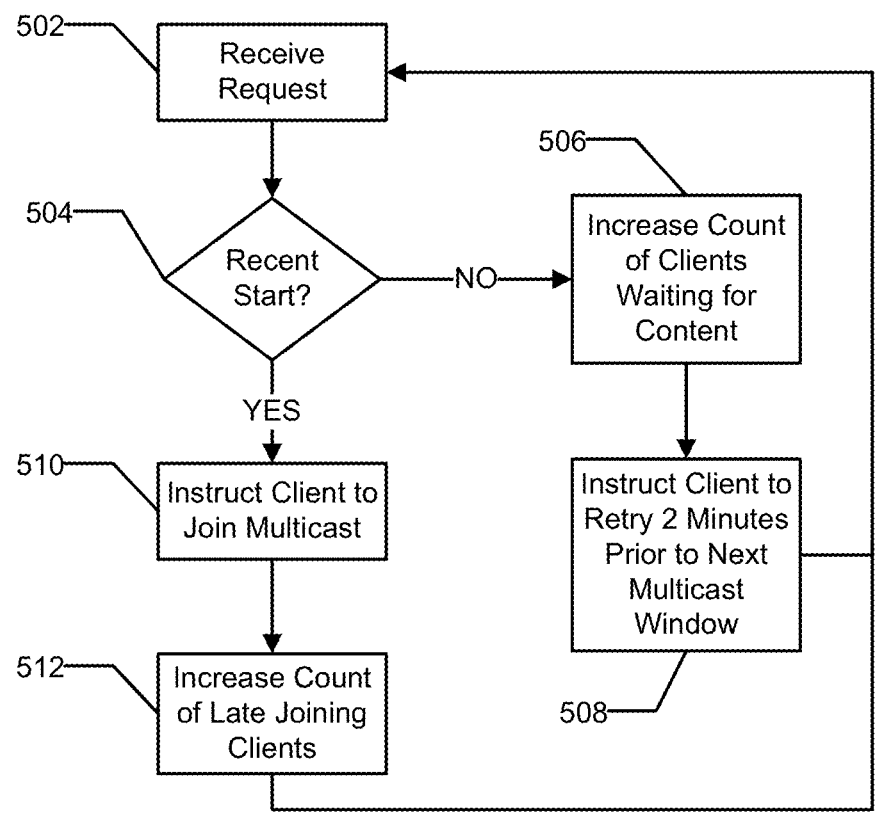
FIG. 5 is a flow diagram illustrating another exemplary method of providing content in accordance with one embodiment of the present disclosure.

FIG. 5 illustrates another exemplary method of delivering content. At 502, a content distribution system, such as content distribution system 200, can receive a request for content currently being distributed using multicast. At 504, the content distribution system can determine if the multicast has been recently started. When the multicast has been recently started, the client system can join the multicast to receive a later portion of the content and retrieve an earlier portion of the content separately. For example, the client system can receive an earlier portion of the content using unicast distribution either concurrently with the multicast distribution or after the multicast distribution has ended. Alternatively, the client system can join the current multicast to receive the later portion of the content and join a second multicast to receive the earlier portion of the content.

Determining whether a multicast session has been recently started may depend on how the client system should receive the earlier portion of the content. When the earlier portion of the content should be retrieved using a unicast protocol, a relatively small earlier portion may be desirable, resulting in a relative short time period for a multicast session to be considered recently started. Alternatively, when the earlier portion should be retrieved using a multicast protocol, a relatively large earlier portion may also be acceptable and the multicast session may be considered recently started as long as the later portion is sufficient to justify the cost of joining the current multicast group instead of waiting for a later multicast group. In an embodiment, the number of clients waiting to join a multicast group for the content may be used to determine if the multicast session has been recently started. For example, once a sufficient number of client systems have joined a multicast group late to justify multicast delivery of the earlier portion, additional clients may be instructed to wait to join the next multicast session of the content.

When the multicast session has not been recently started, the content delivery system can increase a count of clients waiting for content, as illustrated at 506, and instruct the clients to retry shortly before the start of the next multicast session, as illustrated at 508. Because the count of clients waiting for content is being tracked, the content delivery system may not need to count the clients again before determining if multicast delivery of the content is more efficient. Alternatively, the content delivery system may not count the number of clients waiting for the content and instead count the clients when they try again.

Returning to 504, when the multicast session has been recently started, the content distribution system can instruct the client system to join the multicast group, as illustrated at 510. Preferably, a client can be instructed to join the existing multicast session unless the multicast session may end prior to the client joining. Additionally, the content distribution system can count the number of clients joining the multicast group late in order to determine if there is a sufficient number of systems to justify utilizing a multicast protocol to distribute the earlier portion of the content. In an embodiment, the content distribution system can instruct client systems to join a new multicast to receive the earlier portion of the content or extend the multicast session to provide the earlier portion of the content when there is a sufficient number of systems to justify utilizing a multicast protocol to distribute the earlier portion of the content.

In an exemplary embodiment, the content distribution system can track when client systems join the existing multicast session to estimate a size of the earlier portion of the content needed by each client system joining the existing multicast system. In addition to the number of client systems, the determination to use a multicast session to provide the earlier portion of the content can include information about the amount of content needed by each of the client systems. For example, the cost savings for adding an additional client to a multicast may be weighted by the amount of content needed by the client.

Figure 6:
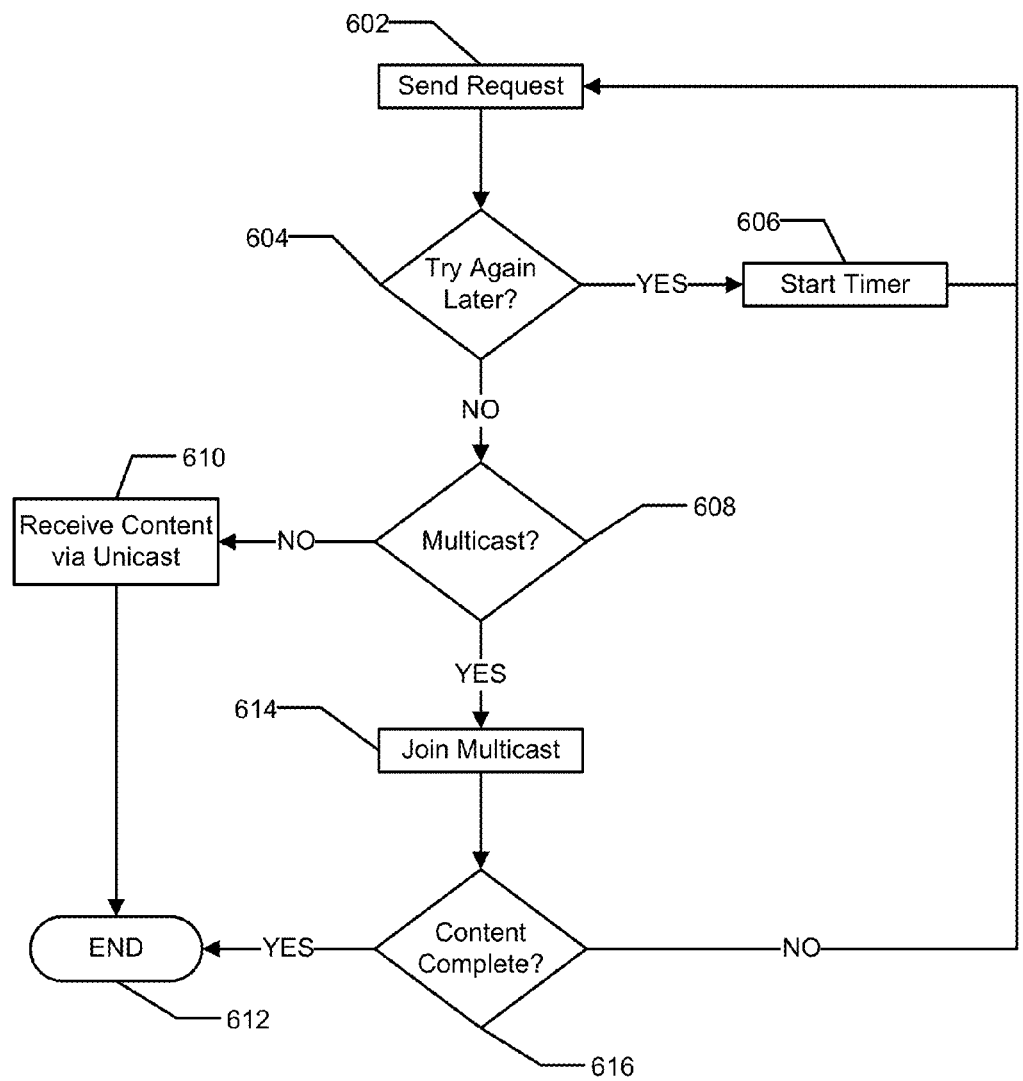
FIG. 6 is a flow diagram illustrating an exemplary method of receiving content in accordance with one embodiment of the present disclosure.

FIG. 6 illustrates an exemplary embodiment of a method of receiving content. At 602, the client system can send a request for content to a content delivery system, such as content delivery system 200. At 604, the client system can determine if instructions received from the content delivery system indicate that the client system should try again later. When the instructions indicate that the client system should try again, the client system can start a timer, as illustrated at 606. The timer can count down a number of minutes or seconds and the client system can send a request at 602 after the timer has reached the number of minutes or seconds.

Returning to 604, when the instructions do not indicate that the client system should try again later, the client system can determine if the instructions indicate that the client system should join a multicast group to receive the content, as illustrated at 608. If the instructions do not indicate that the client system should join a multicast group, the client system can retrieve the content using a unicast connection, as illustrated at 610. Once the content has been received, the process can end at 612.

Alternatively, when the instructions indicate that the client system should join a multicast group, the client system can join the multicast group, as illustrated at 614. Once the content delivery system has completed sending the content to the multicast group, the client system can determine if the content is complete, as illustrated at 616. The content may not be complete if the client system joined the multicast group late or if portions of the content were lost due to network errors. When the content is not complete, the client system can send a request for the missing portion of the content, as illustrated at 602. Alternatively, at 612, when the content is complete, the process can end.

Figure 7:
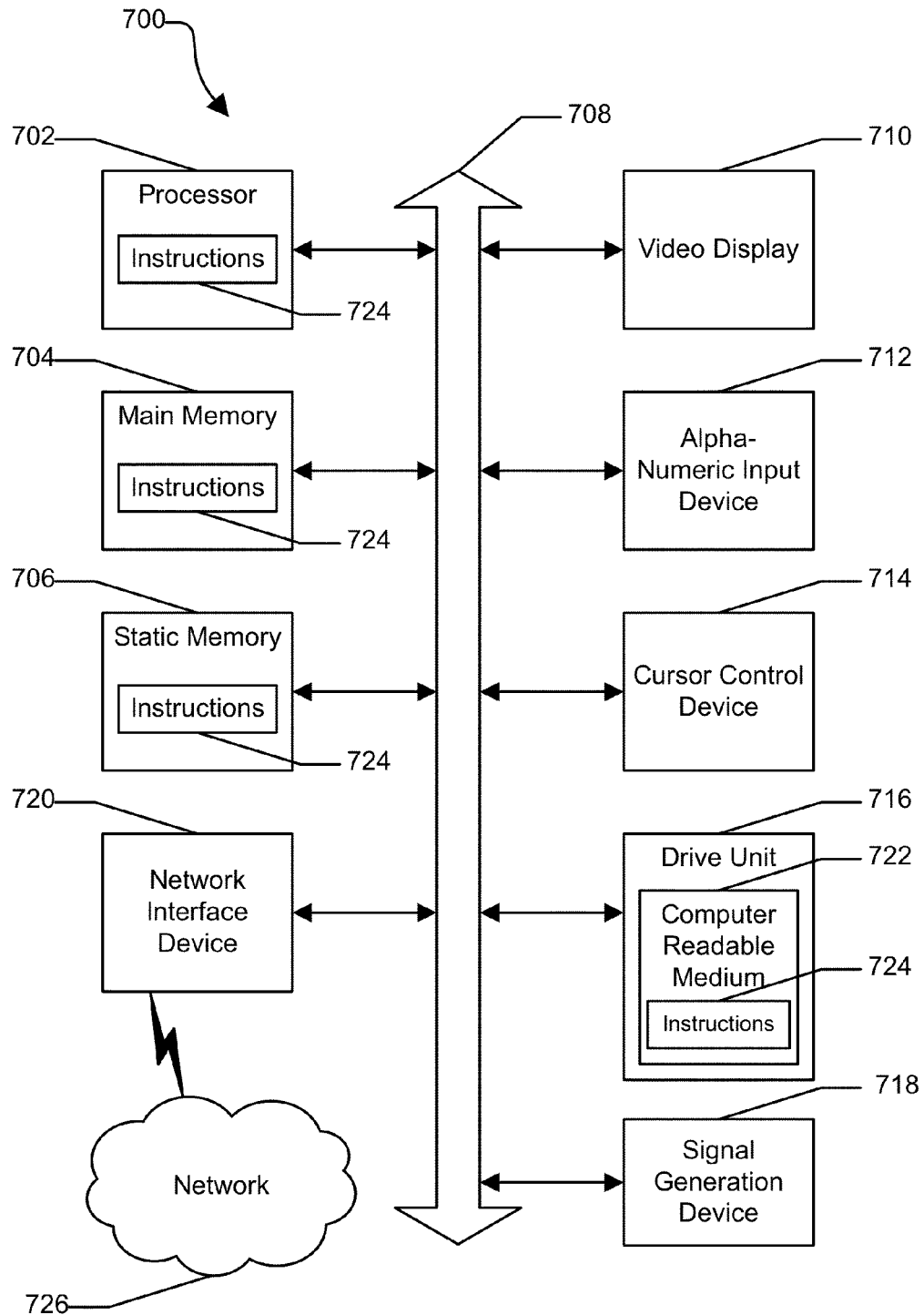
FIG. 7 is an illustrative embodiment of a general computer system.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices. Examples of the general computer system can include server 102, distribution point 120, client system 104, any computer system component of content monitor module 202, unicast content delivery module 204, or multicast content delivery module 206, and the like.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A system, comprising:
    a memory that stores instructions;
    a processor that executes the instructions to perform operations, the operations comprising:
        instructing, if a quantity of requests for content is determined to exceed a first threshold, each of a plurality of client systems to join a multicast group to receive the content; and
        determining, based on determining a number of client systems waiting to join the multicast group, if a first multicast session associated with the multicast group has been started within a period of time.

2. The system of claim 1, wherein the operations further comprise counting the requests for the content to determine if the quantity of the requests for the content exceeds the first threshold.

3. The system of claim 1, wherein the operations further comprise counting a number of late client systems joining the multicast group after a first portion of the content has been sent to the multicast group.

4. The system of claim 1, wherein the operations further comprise transmitting, to a first client system of the client systems, a set of instructions that indicate that the first client system should request the content again.

5. The system of claim 1, wherein the operations further comprise increasing a count of client systems waiting for the content when the first multicast session associated with the multicast group has been determined to not be started within the period of time.

6. The system of claim 1, wherein the operations further comprise tracking when each client system joins the first multicast session to estimate a size of a first portion of the content.

7. The system of claim 1, wherein the operations further comprise instructing, if the quantity of the requests for the content is determined to not exceed the first threshold, each of the plurality of client systems to receive the content via unicast delivery.

8. The system of claim 1, wherein the operations further comprise enabling a portion of the plurality of client systems to obtain a first portion of the content via unicast delivery and a second portion of the content via the first multicast session.

9. The system of claim 1, wherein the operations further comprise distributing a second portion of the content to late client systems in a second multicast session if the first multicast session associated with the multicast group has been determined to have been started within the period of time and if a first portion of the content has already been distributed via the first multicast session.

10. The system of claim 1, wherein the operations further comprise determining an amount of the content to be distributed to each of the client systems.

11. A method, comprising:
    instructing, if a quantity of requests for content is determined to exceed a first threshold, each of a plurality of client systems to join a multicast group to receive the content; and
    determining, based on determining a number of client systems waiting to join the multicast group and by utilizing instructions from a memory that are executed by a processor, if a first multicast session associated with the multicast group has been started within a period of time.

12. The method of claim 11, further comprising counting the requests for the content to determine if the quantity of the requests for the content exceeds the first threshold.

13. The method of claim 11, further comprising counting a number of late client systems joining the multicast group after a first portion of the content has been sent to the multicast group.

14. The method of claim 11, further comprising transmitting, to a first client system of the client systems, a set of instructions that indicate that the first client system should request the content again.

15. The method of claim 11, further comprising increasing a count of client systems waiting for the content when the first multicast session associated with the multicast group has been determined to not be started within the period of time.

16. The method of claim 11, further comprising tracking when each client system joins the first multicast session to estimate a size of a first portion of the content.

17. The method of claim 11, further comprising instructing, if the quantity of the requests for the content is determined to not exceed the first threshold, each of the plurality of client systems to receive the content via unicast delivery.

18. The method of claim 11, further comprising enabling a portion of the plurality of client systems to obtain a first portion of the content via unicast delivery and a second portion of the content via the first multicast session.

19. The method of claim 11, further comprising distributing a second portion of the content to late client systems in a second multicast session if the first multicast session associated with the multicast group has been determined to have been started within the period of time and if a first portion of the content has already been distributed via the first multicast session.

20. A computer-readable device comprising instructions, which when loaded and executed by a processor, cause the processor to perform operations, the operations comprising:
  instructing, if a quantity of requests for content is determined to exceed a first threshold, each of a plurality of client systems to join a multicast group to receive the content; and
  determining, based on determining a number of client systems waiting to join the multicast group, if a first multicast session associated with the multicast group has been started within a period of time.

* * * * *